United States Patent
Carpenter et al.

(10) Patent No.: US 10,135,855 B2
(45) Date of Patent: Nov. 20, 2018

(54) NEAR-REAL-TIME EXPORT OF CYBER-SECURITY RISK INFORMATION

(71) Applicant: Honeywell International Inc., Morris Plains, NJ (US)

(72) Inventors: Seth G. Carpenter, Phoenix, AZ (US); Eric D. Knapp, Milton, NH (US)

(73) Assignee: Honeywell International Inc., Morris Plains, NJ (US)

( * ) Notice: Subject to any disclaimer, the term of this patent is extended or adjusted under 35 U.S.C. 154(b) by 199 days.

(21) Appl. No.: 15/001,073

(22) Filed: Jan. 19, 2016

(65) Prior Publication Data

US 2017/0208086 A1 Jul. 20, 2017

(51) Int. Cl.
*G06F 21/00* (2013.01)
*H04L 29/06* (2006.01)

(52) U.S. Cl.
CPC .............................. *H04L 63/1433* (2013.01)

(58) Field of Classification Search
None
See application file for complete search history.

(56) References Cited

U.S. PATENT DOCUMENTS

| | | | |
|---|---|---|---|
| 6,266,773 B1 | 7/2001 | Kisor et al. | |
| 7,136,856 B2 | 11/2006 | Birbo et al. | |
| 7,743,421 B2* | 6/2010 | Cosquer | H04L 63/1416 709/224 |
| 7,921,459 B2 | 4/2011 | Houston et al. | |
| 7,984,504 B2 | 7/2011 | Hernacki et al. | |
| 8,020,210 B2 | 9/2011 | Tippett et al. | |
| 8,087,087 B1 | 12/2011 | Oorschot et al. | |
| 8,479,276 B1* | 7/2013 | Vaystikh | G06F 21/577 713/160 |
| 8,494,974 B2 | 7/2013 | Watters et al. | |
| 8,776,168 B1 | 7/2014 | Gibson et al. | |
| 2003/0154393 A1 | 8/2003 | Young | |

(Continued)

FOREIGN PATENT DOCUMENTS

| | | |
|---|---|---|
| JP | 2008-112284 | 5/2008 |
| KR | 10-2005-0068052 | 7/2005 |

(Continued)

OTHER PUBLICATIONS

Notification of Transmittal of International Search Report and the Written Opinion of the International Searching Authority, or the Declaration dated Jun. 3, 2016 in connection with International Application No. PCT/US2016/016798, 10 pages.

(Continued)

*Primary Examiner* — Maung T Lwin

(57) ABSTRACT

This disclosure provides an apparatus and method for near-real-time export of cyber-security risk information, including but not limited to in industrial control systems and other systems. A method includes monitoring, by a risk manager system, a plurality of connected devices that are vulnerable to cyber-security risks. The method includes detecting a cyber-security risk to one or more of the devices being monitored. The method includes identifying an external system to be notified of the detected cyber-security risk. The method includes sending cyber-security risk data to the external system according to the detected cyber-security risk and at least one filtering option.

20 Claims, 4 Drawing Sheets

(56) References Cited

U.S. PATENT DOCUMENTS

| | | | |
|---|---|---|---|
| 2005/0010821 | A1 | 1/2005 | Cooper et al. |
| 2005/0022029 | A1* | 1/2005 | Potter .............. G06F 17/30595 |
| | | | 726/4 |
| 2005/0144480 | A1 | 6/2005 | Kim et al. |
| 2006/0010493 | A1 | 1/2006 | Piesco et al. |
| 2006/0123482 | A1 | 6/2006 | Aaron |
| 2006/0174121 | A1 | 8/2006 | Omae et al. |
| 2006/0206941 | A1 | 9/2006 | Collins |
| 2007/0223398 | A1 | 9/2007 | Luo et al. |
| 2008/0047016 | A1 | 2/2008 | Spoonamore |
| 2008/0172347 | A1 | 7/2008 | Bernoth et al. |
| 2008/0235196 | A1 | 9/2008 | Broussard et al. |
| 2008/0262822 | A1 | 10/2008 | Hardwick et al. |
| 2009/0121860 | A1 | 5/2009 | Kimmel et al. |
| 2010/0121929 | A1* | 5/2010 | Lin ....................... G06F 21/577 |
| | | | 709/206 |
| 2010/0125911 | A1 | 5/2010 | Bhaskaran |
| 2010/0125912 | A1 | 5/2010 | Greenshpon et al. |
| 2011/0231412 | A1 | 9/2011 | Kariv |
| 2012/0011077 | A1* | 1/2012 | Bhagat ................. G06F 21/554 |
| | | | 705/317 |
| 2012/0185945 | A1* | 7/2012 | Andres ................... G06F 21/56 |
| | | | 726/25 |
| 2012/0191660 | A1 | 7/2012 | Hoag |
| 2012/0224057 | A1 | 9/2012 | Gill et al. |
| 2013/0067558 | A1 | 3/2013 | Markham et al. |
| 2013/0160119 | A1 | 6/2013 | Sartin et al. |
| 2013/0212214 | A1* | 8/2013 | Lawson ........... G06Q 10/06315 |
| | | | 709/217 |
| 2013/0239167 | A1* | 9/2013 | Sreenivas ............. H04W 12/12 |
| | | | 726/1 |
| 2013/0269034 | A1 | 10/2013 | Selep et al. |
| 2013/0347107 | A1 | 12/2013 | Williams et al. |
| 2014/0033310 | A1 | 1/2014 | Cheng |
| 2014/0082738 | A1 | 3/2014 | Bahl |
| 2014/0130121 | A1 | 5/2014 | Lin |
| 2014/0172706 | A1* | 6/2014 | Condry .................. G06Q 30/00 |
| | | | 705/44 |
| 2014/0189860 | A1 | 7/2014 | Hull Roskos |
| 2014/0215555 | A1 | 7/2014 | Barton et al. |
| 2014/0283083 | A1 | 9/2014 | Gula et al. |
| 2014/0344888 | A1 | 11/2014 | Yun et al. |
| 2015/0229664 | A1* | 8/2015 | Hawthorn ........... H04L 63/1433 |
| | | | 726/25 |
| 2016/0205126 | A1* | 7/2016 | Boyer ................. H04L 63/1433 |
| | | | 726/25 |

FOREIGN PATENT DOCUMENTS

| | | |
|---|---|---|
| KR | 10-1060277 | 8/2011 |
| KR | 10-2014-0097691 | 8/2014 |
| WO | WO 2013/166126 A1 | 11/2013 |

OTHER PUBLICATIONS

Notification of Transmittal of International Search Report and the Written Opinion of the International Searching Authority, or the Declaration dated May 13, 2016 in connection with International Application No. PCT/US2016/015890, 11 pages.

Notification of Transmittal of International Search Report and the Written Opinion of the International Searching Authority, or the Declaration dated May 13, 2016 in connection with International Application No. PCT/US2016/016098, 12 page.

Notification of Transmittal of International Search Report and the Written Opinion of the International Searching Authority, or the Declaration dated Jun. 13, 2016 in connection with International Application No. PCT/US2016/016496, 12 pages.

Notification of Transmittal of International Search Report and the Written Opinion of the International Searching Authority, or the Declaration dated Jun. 3, 2016 in connection with International Application No. PCT/US2016/016399, 11 pages.

Notification of Transmittal of International Search Report and the Written Opinion of the International Searching Authority, or the Declaration dated Jun. 3, 2016 in connection with International Application No. PCT/US2016/016265, 10 pages.

Notification of Transmittal of International Search Report and the Written Opinion of the International Searching Authority, or the Declaration dated Jun. 2, 2016 in connection with International Application No. PCT/US2016/015952, 11 pages.

Notification of Transmittal of International Search Report and the Written Opinion of the International Searching Authority, or the Declaration dated May 18, 2016 in connection with International Application No. PCT/US2016/016159, 11 pages.

Foreign Communication from Related Counterpart Application, PCT Application No. PCT/US2017/012500; International Search Report and the Written Opinion of the International Searching Authority dated Apr. 24, 2017, 11 pages.

Gerhards, R.; "The Syslog Protocol"; Network Working Group; Adiscon GmbH; Mar. 2009; 38 pages.

Knapp, E.D.; "Security Intelligence and Analytics in Industrial Systems"; Honeywell Users Group Europe, Middle East and Africa; 2014; 29 pages.

Koelemij, E.D.; "Effective Defense in Depth Strategies for Industrial Control Systems"; Honeywell Users Group Europe; Middle East and Africa; 2014; 21 pages.

Koelemij, S.; "Designing a Secure Industrial Control System"; Honeywell Users Group EMEA; Industrial IT Solutions: 2013; 11 pages.

Koelemij, S.; "Making Cyber Security S.M.A.R.T."; Honeywell Industrial Cyber Security; EMEA HUG Training Session; 2014; 63 pages.

Ricks, B.; "System Center 2012 R2 Operations Manager Documentation"; Microsoft System Center 2012 R2; Microsoft Corp; Nov. 1, 2013; 1389 pages.

Spear, M.; "Industrial Cyber Security 101"; Honeywell Users Group Europe, Middle East and Africa; 2015; 25 pages.

"Certification Testing Specification"; OPC Foundation; Release Candidate 1.02; May 28, 2014; 20 pages.

"Guide for Conducting Risk Assessments—Information Security"; NIST Special Publication 800-30, Revision 1; NIST, U.S. Dept of Commerce; Sep. 2012; 95 pages.

"Honeywell Industrial Cyber Security Overview and Managed Industrial Cyber Security Services"; HPS; Jun. 4, 2014; 19 pages.

"Information Technology—Security Techniques—Information Security Risk Management"; Bio Standards Publication; BS ISO/IEC 27005;2011; 80 pages.

"Risk Management and Critical Infrastructure Protection: Assessing, Integrating, and Managing Threats, Vulnerabilities and Consequences"; CRS Rpt for Congress; RL32561; Feb 4, 2005; 28 pages.

"Security for Industrial Automation and Control Systems Part 2-3: Patch Management in the IACS Environment"; ISA-TR62443-2-3-2015; Jul. 1, 2015; 18 pages.

"Design and Planning Guide for System Center 2012—Operatoins Manager"; System Center 2012; Microsoft Corporation; Apr. 2012; 13 pages.

\* cited by examiner

NEAR-REAL-TIME EXPORT OF CYBER-SECURITY RISK INFORMATION

TECHNICAL FIELD

This disclosure relates generally to network security. More specifically, this disclosure relates to an apparatus and method for near-real-time export of cyber-security risk information.

BACKGROUND

Processing facilities are often managed using industrial process control and automation systems. Conventional control and automation systems routinely include a variety of networked devices, such as servers, workstations, switches, routers, firewalls, safety systems, proprietary real-time controllers, and industrial field devices. Often times, this equipment comes from a number of different vendors. In industrial environments, cyber-security is of increasing concern, and unaddressed security vulnerabilities in any of these components could be exploited by attackers to disrupt operations or cause unsafe conditions in an industrial facility.

SUMMARY

This disclosure provides an apparatus and method for near-real-time export of cyber-security risk information, including but not limited to in industrial control systems and other systems. A method includes monitoring, by a risk manager system, a plurality of connected devices that are vulnerable to cyber-security risks. The method includes detecting a cyber-security risk to one or more of the devices being monitored. The method includes identifying an external system to be notified of the detected cyber-security risk. The method includes sending cyber-security risk data to the external system according to the detected cyber-security risk and at least one filtering option.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
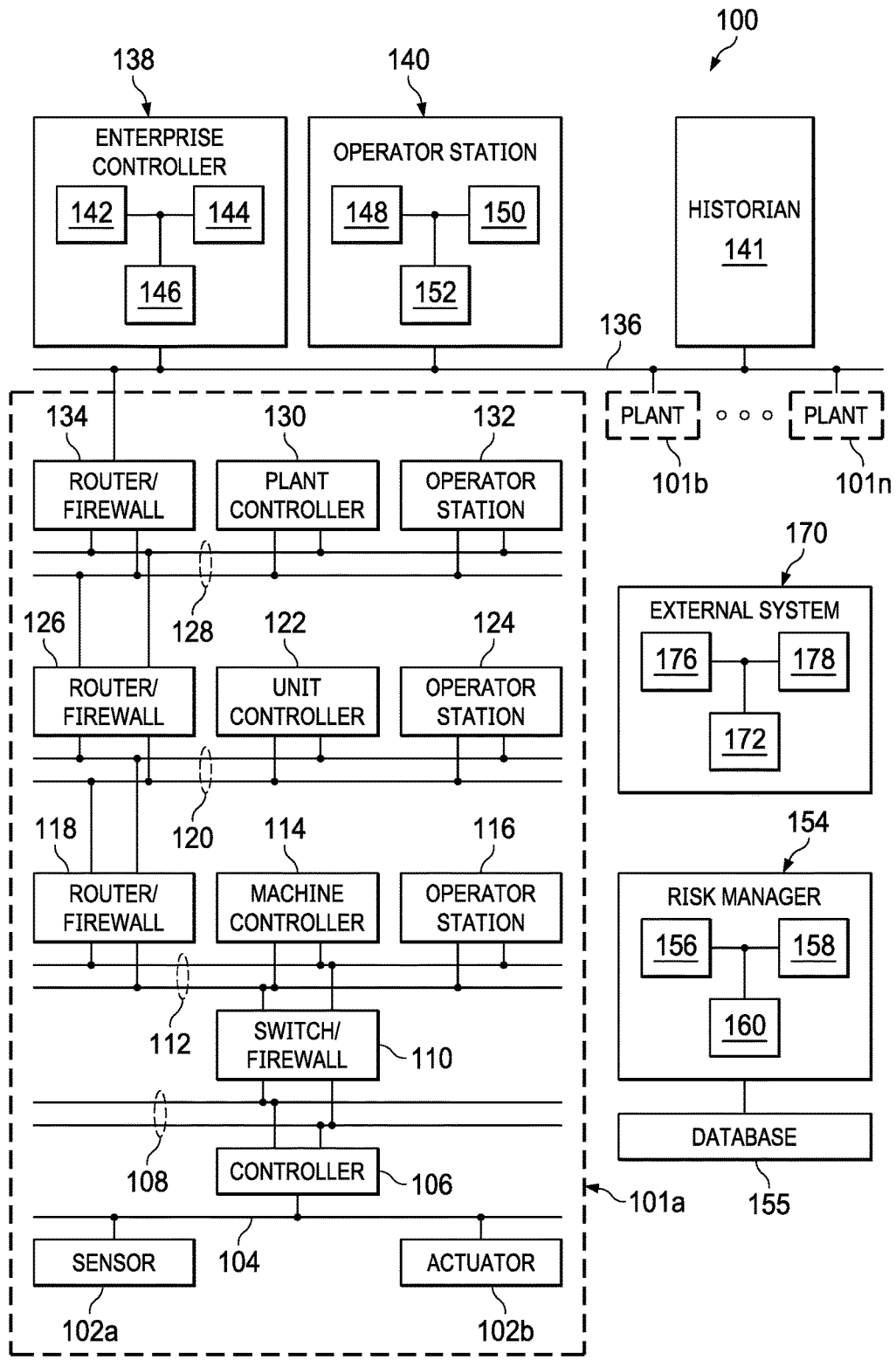
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a proportional-integral-derivative (PID) controller or a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106, sensors 102*a*, and actuators 102*b*, which could be associated with a particular piece of industrial equipment (such as a boiler or other machine). For example, the machine-level controllers 114 could log information collected or generated by the controllers 106, such as measurement data from the sensors 102*a* or control signals for the actuators 102*b*. The machine-level controllers 114 could also execute applications that control the operation of the controllers 106, thereby controlling the operation of the actuators 102*b*. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102*a*, and actuators 102*b*).

One or more operator stations 116 are coupled to the networks 112. The operator stations 116 represent computing or communication devices providing user access to the machine-level controllers 114, which could then provide user access to the controllers 106 (and possibly the sensors 102*a* and actuators 102*b*). As particular examples, the operator stations 116 could allow users to review the operational history of the sensors 102*a* and actuators 102*b* using information collected by the controllers 106 and/or the machine-level controllers 114. The operator stations 116 could also allow the users to adjust the operation of the sensors 102*a*, actuators 102*b*, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102*a*, and actuators 102*b*).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 101*a*-101*n*, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101*a*-101*n* and to control various aspects of the plants 101*a*-101*n*. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 could include one or more processing devices 142 and one or more memories 144 for storing instructions and data used, generated, or collected by the processing device(s) 142. Each of the controllers 106, 114, 122, 130, 138 could also include at least one network interface 146, such as one or more Ethernet interfaces or wireless transceivers. Also, each of the operator stations 116, 124, 132, 140 could include one or more processing devices 148 and one or more memories 150 for storing instructions and data used, generated, or collected by the processing device(s) 148. Each of the operator stations 116, 124, 132, 140 could also include at least one network interface 152, such as one or more Ethernet interfaces or wireless transceivers.

As noted above, cyber-security is of increasing concern with respect to industrial process control and automation systems. Unaddressed security vulnerabilities in any of the components in the system 100 could be exploited by attackers to disrupt operations or cause unsafe conditions in an industrial facility. In industrial environments, cyber security is of increasing concern, and it is difficult to quickly determine the potential sources of risk to the whole system. Modern control systems contain a mix of Windows servers and workstations, switches, routers, firewalls, safety systems, proprietary real-time controllers and field devices, any of which can be implemented by one or another of the components in system 100.

Often these systems are a mixture of equipment from different vendors. Sometimes the plant operators do not have a complete understanding or inventory of all the equipment running in their site. Unaddressed security vulnerabilities in any of these components could be exploited by attackers to disrupt production or cause unsafe conditions in the plant. In such environments, it can be difficult to quickly determine the potential sources of risk to the whole system.

Any monitoring system will necessarily have some performance impact on the monitored system, no matter how small. It will also have some requirements or prerequisites that must be met in order to monitor that system. The highest priorities for a control system are safety and production, so it is critical that any monitoring of that system does not jeopardize either of these aspects. This is true whether an agent is installed on the end devices for monitoring or whether "agentless" protocols are used for monitoring (which take advantage of hooks and APIs already present in the end devices).

A monitoring system then should be able to verify these requirements and ensure that it will not have an adverse impact on system safety or production prior to starting its monitoring. This can be accomplished (among other ways) using a risk manager 154. Among other things, the risk manager 154 supports a technique for monitoring a system such as an industrial control system and checking for proper deployment of the devices and components of that system.

In this example, the risk manager 154 includes one or more processing devices 156; one or more memories 158 for storing instructions and data used, generated, or collected by the processing device(s) 156; and at least one network interface 160. Each processing device 156 could represent a microprocessor, microcontroller, digital signal process, field programmable gate array, application specific integrated circuit, or discrete logic. Each memory 158 could represent a volatile or non-volatile storage and retrieval device, such as a random access memory or Flash memory. Each network interface 160 could represent an Ethernet interface, wireless transceiver, or other device facilitating external communication. The functionality of the risk manager 154 could be implemented using any suitable hardware or a combination of hardware and software/firmware instructions. In some embodiments, the risk manager 154 includes, or is communication with, a database 155. The database 155 denotes any suitable structure facilitating storage and retrieval of information.

Disclosed embodiments enable the efficient and near-real-time export of cyber-security data from a system such as risk manager 154 to an external system 170. In this example, the external system 170 includes one or more processing devices 176; one or more memories 178 for storing instructions and data used, generated, or collected by the processing device(s) 176; and at least one network interface 172. Each processing device 176 could represent a microprocessor, microcontroller, digital signal process, field programmable gate array, application specific integrated circuit, or discrete logic. Each memory 178 could represent a volatile or non-volatile storage and retrieval device, such as a random access memory or Flash memory. Each network interface 172 could represent an Ethernet interface, wireless transceiver, or other device facilitating external communication. The functionality of the external system 170 could be implemented using any suitable hardware or a combination of hardware and software/firmware instructions. The external system 170 can be, for example, a stand-alone data processing system, a mobile device, an external server or enterprise system, or otherwise. The exemplary structure of the external system 170 described above is not intended to limit the structure or function of the devices that could be used to implement the external system 170.

Although FIG. 1 illustrates one example of an industrial process control and automation system 100, various changes may be made to FIG. 1. For example, a control and automation system could include any number of sensors, actuators, controllers, servers, operator stations, networks, risk managers, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates an example environment in which the functions of the risk manager 154 can be used. This functionality can be used in any other suitable device or system.

In some risk manager implementations, the user installing and configuring the risk manager would be responsible for verifying that each end device is ready for monitoring. In many cases, a user will simply attempt to monitor the end device and hope there are no adverse effects. The attempt to monitor the device may also fail, leaving the user to contact technical support or try independently troubleshooting.

Disclosed embodiments provide systems and methods for notifying external systems and users of cyber-security vulnerabilities. Disclosed embodiments can understand the potential vulnerabilities in all these systems, prioritize the vulnerabilities based on the risk to the system, and guide the user to mitigate the vulnerabilities.

A risk manager system can monitor these aspects of cyber security risk as the first step, but only provides information that a user must receive and act on. In a simple embodiment of a risk management system, a user must remember to check it to see the cyber security risk status of their system. If a user does not do so frequently, risks and vulnerabilities in the system will go unnoticed and uncorrected.

Even when a user is diligent in checking the system status, a typical user only has access to a risk manager system during their working hours. Important changes in the system that happened after hours or during the weekend might not been seen until the next day or week. Even in applications like process control, where the facility may have operators on-site 24 hours a day, those operators monitor the process itself, and typically do not monitor the status of the actual control system or its cyber-security risks. In such cases, it can be important for the risk manager system to communicate cyber-security risk information to an external system.

In other systems, such as those incorporated by reference below, a user generally must log into the risk manager system to see cyber security risk information about the system. The only way to access this information remotely is through a secured, authorized tunnel (remote desktop, virtual network computing, etc.). Even then, the user still needs to log into the system and review the information presented to make decisions.

Disclosed embodiments provide ways of getting that information out of the risk manager system without the need for a user to first log in and access the system. Instead, whenever a pertinent piece of information is detected by the system, the data export is initiated.

Various embodiments include such novel features as the option to receive filtered or unfiltered streams of data, options to filter data based on the source of the risk, the severity, the affected device(s), or the zone(s) the device belongs to, and, in addition to source and severity filters, filtering data according to configured risk appetite and risk tolerance levels. Various embodiments can include options to specify the output format. Possible output formats include, but are not limited to, e-mail messages, syslog messages, and mobile application notifications. Various embodiments can also include options to configure the system output according to the options discussed above as well as according to the recipients of each data stream.

Risk appetite and risk tolerance levels are described in detail in U.S. patent application Ser. No. 14/871,136, incorporated by reference herein. In some embodiments, how risk matters to an organization is determined through the use of two threshold values: risk appetite and risk tolerance. These thresholds dictate when an organization is capable of absorbing risk and when action needs to be taken. For example, if below an organization's risk appetite, a risk is acceptable. If above the risk appetite, the risk should be addressed. The risk tolerance is a higher threshold that determines when a risk has become dangerously high; action should still be taken but now with increased urgency. In processes described herein, the detected risks can be evaluated and compared to the risk tolerance and risk appetite thresholds to determine whether a user should be notified.

Figure 2:
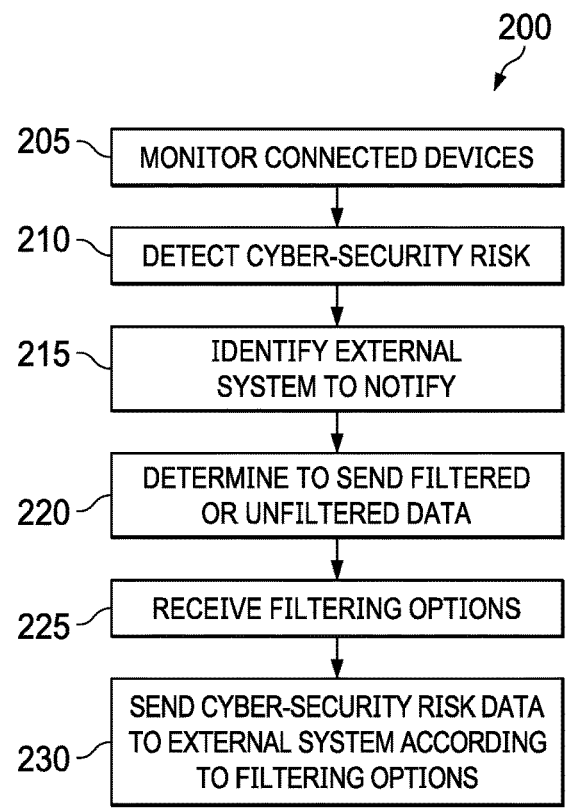
FIG. 2 illustrates a flowchart of a process in accordance with disclosed embodiments.

FIG. 2 illustrates a flowchart of a method 200 in accordance with disclosed embodiments, as can be performed, for example, by risk manager 154 or another device or controller (referred to as the "system" or "risk manager system" below) that sends data to an external system, which can be implemented as any data processing system or mobile device capable of receiving and processing the data as described.

The system monitors a plurality of connected devices that are vulnerable to cyber-security risks (205). These devices can be any computing devices, such as any of the components of FIG. 1 or those described below.

The system detects a cyber-security risk to one or more of the devices being monitored (210).

The system identifies an external system to be notified of the detected cyber-security risk (215).

The system determines whether to send filtered or unfiltered data to the external system (220). This can be determined according to a user-selectable filtering option, in some cases, and the system can receive such a selection of the filtering option to receive filtered or unfiltered streams of data at the external system as described below.

Unfiltered data streams are particularly useful to feed risk information to an external system such as a Security Information and Event Management (SIEM) system. Some users already have SIEMs running in their corporate network, but they are not qualified for data collection in an industrial control system. This allows the SIEM to collect information that would otherwise be inaccessible. The unfiltered data streams can also be used to generate reports or to create a historical record of the risk information in the system.

Filtered data streams are particularly useful when sending information directly to a user's external system, whether a desktop-type data processing system, a laptop data processing system, a mobile device, or otherwise. The volume of data in the unfiltered stream can be too excessive for a user to try to parse manually. By providing filters on the data, the external system and user are presented with a manageable set of information without losing notifications of critical changes in the system.

The system receives filtering options for the external systems (225). This step can be performed at a different time, such as when configuring the risk manager system. Selecting configuration options (e.g., selecting recipients or any of the other options described herein) can be treated as a privileged, administrator action. Because of the sensitive nature of the cyber security risk information monitored, allowing unprivileged users to configure this output could expose critical system vulnerability and threat information to unauthorized and malicious users.

The filtering options can include, but are not limited to, such aspects as the source of the cyber-security risk, the risk severity, the device(s) affected by the identified cyber-security risk, the affected zone(s) (or other groupings) of the affected devices, and others. The filtering options can include only sending data when crossing a defined threshold, such as going above the configured risk appetite and risk tolerance levels.

The filtering options can include options to specify the output format. Possible output formats include, but are not limited to, e-mail messages, syslog messages and mobile application notifications. The at least one filtering option can specify the output format of the cyber-security risk data as described in more detail below.

The filtering options can include options to configure the system output according to the recipient user or recipient external system of the data.

The system sends cyber-security risk data to the external system according to the detected cyber-security risk and at least one filtering option (230). In the case that the external system is an external server (e.g., connecting to an SMPT server in another network for e-mail notifications), the system can use a one-way trust and only authorize outbound communication through that pathway. This allows the notifications to be sent without exposing the system to additional threats. The system can define a consistent output format for each filtering option to allow third parties to parse and understand the information as it is delivered.

The steps in the processes described herein, unless specifically described otherwise, may be performed concurrently, sequentially, or repeatedly, may be omitted, or may be performed in a different order. The processes described above can be performed in near-real-time, such that the cyber-security risk data is send to the external system at substantially the same time that the cyber-security risk is identified, regardless of the time of day or other factors.

Processes as described herein provide a distinct technical advantage over current systems in which notifications, warnings, and alerts are visual only, and are only viewable to an operator or other user that is currently using the system itself. Disclosed embodiments provide means of actively informing users of these notifications.

In some implementations, the cyber-security risk data can be sent to the external system as electronic mail (email) notifications.

Figure 3:
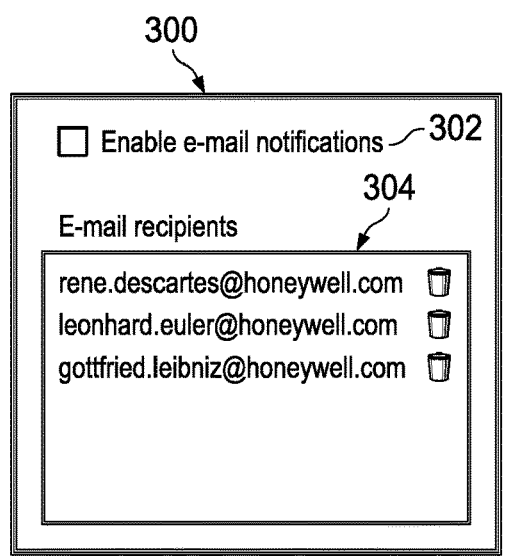
FIGS. 3-5 illustrate example user interfaces that can be used as part of disclosed embodiments.

FIG. 3 illustrates a user interface 300 that may be presented to a user, for example, by the risk manager 154 or another system, for configuring email notifications as part of processes described herein. This example includes a selection 302 for enabling email notifications. This example also includes an email recipient area 304 for listing the email addresses of the users that should receive the cyber-security risk data by email.

Figure 4:
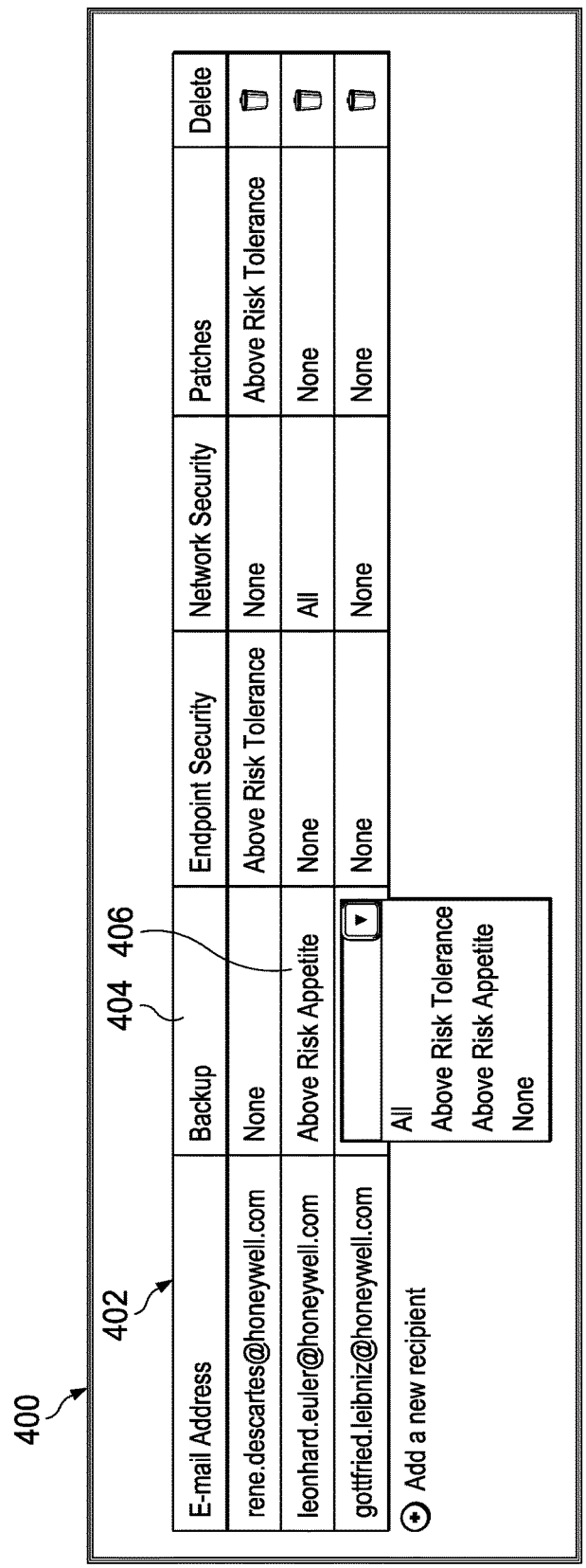

FIG. 4 illustrates a user interface 400 that may be presented to a user, for example, by the risk manager 154 or another system, for configuring email notifications as part of processes described herein. This example includes an email recipient area 402 for listing the email addresses of the users that should receive the cyber-security risk data by email. This example includes configurations for which notifications to be sent to each user based on the device 404 (e.g., the "backup" system) and the risk severity level 406 (e.g., when the cyber-security risk is above a risk appetite). In other cases, simple "check boxes" could be used to select which devices or risks are sent to which users.

As described above, disclosed embodiments can send cyber-security risk data to the external system according to the detected cyber-security risk and any filtering options, including as filtered data in a format such as electronic mail. The following is an example of a notification template that can be used in such embodiments:

```
categorylist[0] = "Risk_Manager";
    entity[0] = new NotificationDetails ( );
    entity[0].Name = "SampleNotification";
    entity[0].Priority = "{Priority}";
    entity[0].Subject = "[Risk Manager] {ManagedEntity}
- {RiskItem} - {TransitionReason}";
    entity[0].Message = @"{ManagedEntity} - {RiskItem}
- {TransitionReason};
    entity[0].Owner = "RiskManager";
    entity[0].CreationTime = DateTime.UtcNow;
    entity[0].Categories = categorylist;
Zone: {Zone}
Device: {ManagedEntity}
Risk Area: {RiskArea}
Risk Item Name: {RiskItem}
Risk Item Value: {RiskValue}
Notification Reason: {TransitionReason}
Timestamp: {OccurrenceDateTime}";
```

In other implementations, the cyber-security risk data can be sent to the external system as short message service (SMS) notifications or as other text messaging notifications.

In other implementations, the cyber-security risk data can be sent to the external system in accordance with the OPC interoperability standard, such as to any OPC based Alarm Management system.

In other implementations, the cyber-security risk data can be sent to the external system as a System Center notification. Such implementations can use System Center or some other inherent Windows service to notify users on other Windows systems.

The cyber-security risk data notifications preferably include as much data as possible, under the assumption that the recipient may not have easy access to the console to get more detail. This can include all detail currently available in an analysis view (including any "detail" pane) and a notification ID, so that a specific notification can be easily found via search from the risk manager console. The notification ID should allow an easy link to the appropriately filtered analysis view.

The system can optionally also automatically assign a workflow based on notification. In such cases, the system can allow a workflow task to be auto-generated for every notification. Such a workflow can include configuration of a default user to whom tasks are assigned and can include configuration of when to assign tasks. This could occur at varying levels of risk severity, including notifications, warnings, or alerts.

Disclosed embodiments can use a syslog service for exporting the cyber-security risk data as disclosed herein. As known to those of skill in the art, syslog is a widely used standard for message logging. It permits separation of the software that generates messages, the system that stores them, and the software that reports and analyzes them.

Figure 5:
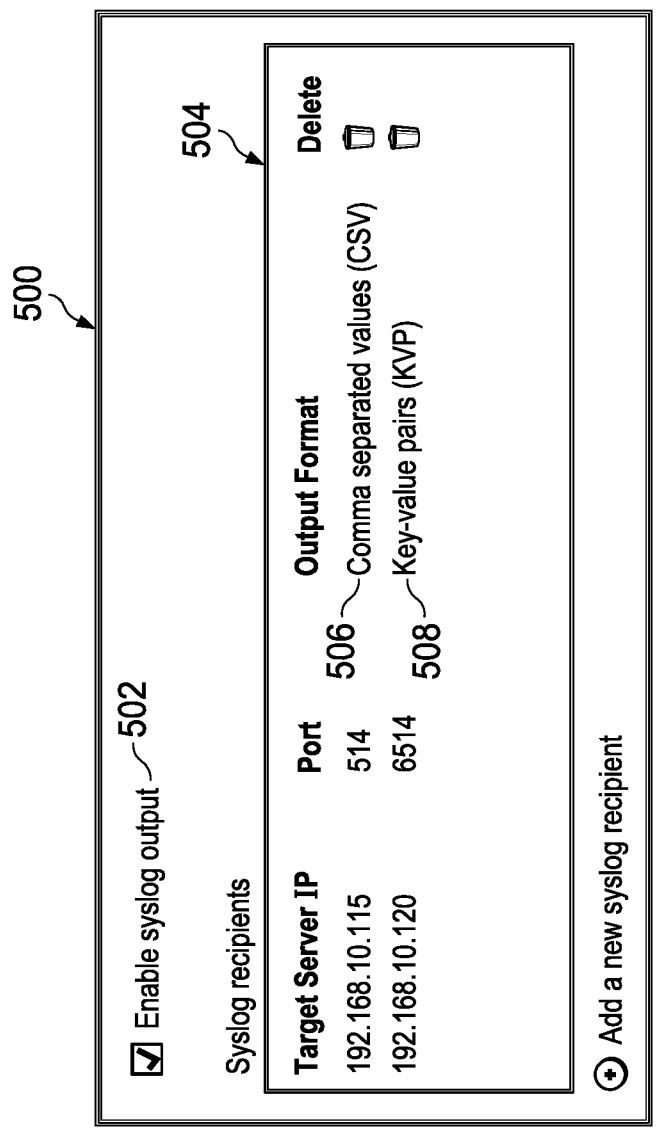

FIG. 5 illustrates a user interface 500 that may be presented to a user, for example by the risk manager 154 or another system, for configuring syslog service notifications as part of processes described herein. This example includes an enable syslog output option 502 for selecting the option to enable a syslog output. This example includes a recipient area 504 that identifies the IP addresses and ports for the systems that will receive the syslog output.

In one exemplary implementation, the system can use a syslog system service running with a system service account with limited access to data thru a representational state transfer (REST) endpoint communicating to the WEBAPI. This system service can subscribe to a REST endpoint specifically used for the syslog service and the security status information that is needed to build the security status object. The WEBAPI can cache the security status information from different source to create a security status object that is sent to the syslog service anytime a new update is sent thru the WEBAPI. The information is formatted and sent out as a syslog message, for example. through a UPD on port 514.

The format of the output can vary according to implementation. For example, in some cases, the system can use a comma separated values (CSV) format. Such a format is a simple output using a fixed field order. In such cases, if a value is not available for a given field, a blank entry should be used to preserve field order (e.g., ", , , . . . "). In the example of FIG. 5, a CSV output format 506 can be used for specific servers according to the filtering options.

Other implementations can use Key-Value Pairs (KVP) formatting, in which each output field is represented as the field and its value. A sample output of such a format could include: {"field1":"value1", "field2":"value2", . . . }. In the example of FIG. 5, a KVP output format 508 can be used for specific servers according to the filtering options.

The table below shows an example of output fields that can be used in some embodiments:

| Parameter | Security Status Record | Sample Value |
| --- | --- | --- |
| Device Name | Yes | STBC-ESC174.IS-CSE-STAB.Local |
| Device IP Address | Yes | 164.145.98.174 |
| Zone | Yes | Default Zone |
| Risk Item Name (Internal Name) | Yes | AWL-File-Execution-Blocked |
| Risk Item Name (Friendly Name) | Yes | File Execution Blocked by AWL |
| Risk Area | Yes | Endpoint Security |
| Risk Classification (Alert, Error, Warning) | Yes | Alert |
| Raw Risk Value | Yes | 100% |
| Current Device Risk | | 100% |
| ISO Classification (Vulnerability, Threat) | Yes | Threat |
| Timestamp | Yes | 2015-06-03T10:28:18.157 |
| Security Status Details | Yes | This is a blob of the data that can be expanded in the analysis view |
| Reason for the notification | Yes | Added, updated, deleted |
| Security status Row ID | Yes | Int |
| Risk Factor | Yes | Float raw risk value |

Following is an example of a syslog service output that could be generated in accordance with disclosed embodiments, particularly in unfiltered-output embodiments:

////////////////////CSV////////////////
///////////RMHOST, 7/10/2 015 11:38:23 AM,CurrentDeviceRisk-0,DeviceIPAddress-192.168.88.141,DeviceName-CQT-ESV-51B.CSD.COM,FriendlyRiskItemName-AWL Not Installed,InternalRiskItemName-AWL-Present,ISOClassification-Vulnerability,RawRiskValue-0.3,RiskAreaName-Endpoint Security,RiskClassification-Error, SecurityStatusDetails-{"AWL Installed":" None"}, Timestamp-7/10/2015 11:38:23 AM,ZoneName-Default Zone RMHOST,7/10/2015 11:38:23 AM,CurrentDeviceRisk-0, DeviceIPAddress-192.168.88.141,DeviceName-CQT-ESV-51B.CSD.COM,FriendlyRiskItemName-CPU usage exceeded threshold,InternalRiskItemName-AT-High-CPU-Usage,ISOClassification-Threat,RawRiskValue-0,RiskAreaName-Endpoint Security,RiskClassification-,SecurityStatusDetails-{"CPU Usage":" 42.97007%"},Timestamp-7/10/2015 11:38:23 AM,ZoneName-Default Zone RMHOST,7/10/2015 11:38:24 AM,CurrentDeviceRisk-0, DeviceIPAddress-192.168.88.141,DeviceName-CQT-ESV-51B.CSD.COM,FriendlyRiskItemName-Malware Protection Not Enabled,InternalRiskItemName-MAL-No-Protection-Enabled,ISOClassification-Vulnerability,RawRiskValue-0,RiskAreaName-Endpoint Security,RiskClassification-, SecurityStatusDetails-{"AV Status":" N/A","AWL Status":" N/A"},Timestamp-7/10/2015 11:38:24 AM,ZoneName-Default Zone RMHOST,7/10/2015 11:38:24 AM,CurrentDeviceRisk-0, DeviceIPAddress-192.168.88.141,DeviceName-CQT-ESV-51B.CSD.COM,FriendlyRiskItemName-Malware Protection Not Installed,InternalRiskItemName-MAL-No-Protection-Installed,ISOClassification-Vulnerability,RawRiskValue-0,RiskAreaName-Endpoint Security,RiskClassification-, SecurityStatusDetails-{"AV Installed":" McAfee", "AWL Installed":" None"},Timestamp-7/10/2015 11:38:24 AM,ZoneName-Default Zone RMHOST,7/10/2015 11:38:24 AM,CurrentDeviceRisk-0, DeviceIPAddress-192.168.88.141,DeviceName-CQT-ESV-51B.CSD.COM,FriendlyRiskItemName-Backup software not installed,InternalRiskItemName-BU-Not-Installed,ISOClassification-Vulnerability,RawRiskValue-0.6,RiskAreaName-Backup,RiskClassification-Error,SecurityStatusDetails-{"Backup Software":" Not Installed"},Timestamp-7/10/2015 11:38:24 AM,ZoneName-Default Zone RMHOST,7/10/2015 11:38:24 AM,CurrentDeviceRisk-0, DeviceIPAddress-192.168.88.141,DeviceName-CQT-ESV-51B.CSD.COM,FriendlyRiskItemName-Memory usage exceeded threshold,InternalRiskItemName-AT-High-Memory-Usage,ISOClassification-Threat,RawRiskValue-0,RiskAreaName-Endpoint Security,RiskClassification-,SecurityStatusDetails-{"Memory Usage":" 86.79%"},Timestamp-7/10/2015 11:38:24 AM,ZoneName-Default Zone RMHOST,7/10/2015 11:38:24 AM,CurrentDeviceRisk-0, DeviceIPAddress-192.168.88.141,DeviceName-CQT-ESV-51B.CSD.COM,FriendlyRiskItemName-AV Not Installed,InternalRiskItemName-AV-Present,ISOClassification-Vulnerability,RawRiskValue-0,RiskAreaName-Endpoint Security,RiskClassification-,SecurityStatusDetails-{"Antivirus Installed":" McAfee", "Antivirus Version":" 5600.1067"},Timestamp-7/10/2015 11:38:24 AM,ZoneName-Default Zone RMHOST,7/10/2015 11:38:24 AM,CurrentDeviceRisk-0, DeviceIPAddress-192.168.88.141,DeviceName-CQT-ESV-51B.CSD.COM,FriendlyRiskItemName-Malware Protection Not Installed,InternalRiskItemName-MAL-No-Protection-Installed,ISOClassification-Vulnerability,RawRiskValue-0,RiskAreaName-Endpoint Security,RiskClassification-, SecurityStatusDetails-{"AV Installed":" McAfee", "AWL Installed":" None"},Timestamp-7/10/2015 11:38:24 AM,ZoneName-Default Zone RMHOST,7/10/2015 11:38:24 AM,CurrentDeviceRisk-0, DeviceIPAddress-192.168.88.141,DeviceName-CQT-ESV-51B.CSD.COM,FriendlyRiskItemName-DAT Out of Date,InternalRiskItemName-AV-Definition-File-Date,ISOClassification-Vulnerability,RawRiskValue-0.75,RiskAreaName-Endpoint Security,RiskClassification-Error, SecurityStatusDetails-{"DAT Age":" about 10 months, 19 days ago","DAT Date":" 2014-08-25"},Timestamp-7/10/2015 11:38:24 AM,ZoneName-Default Zone RMHOST,7/10/2015 11:38:25 AM,CurrentDeviceRisk-0, DeviceIPAddress-192.168.88.141,DeviceName-CQT-ESV-51B.CSD.COM,FriendlyRiskItemName-Windows Auditing Disabled (Special Logon), InternalRiskItemName-WS-Auditing-Special-Logon, ISOClassification-Vulnerability,RawRiskValue-0, RiskAreaName-Endpoint Security,RiskClassification-, SecurityStatusDetails-{"Current Auditing Policy":" Success_and_Failure","Expected Auditing Policy":" \"Success and Failure\" or \"Failure\""},Timestamp-7/10/201511:38:25 AM,ZoneName-Default Zone RMHOST,7/10/2015 11:38:25 AM,CurrentDeviceRisk-0, DeviceIPAddress-192.168.88.141,DeviceName-CQT-ESV-51B.CSD.COM,FriendlyRiskItemName-Windows Auditing Disabled (Account Lockout), InternalRiskItemName-WS-Auditing-Account-Lockout,ISOClassification-Vulnerability, RawRiskValue-0,RiskAreaName-Endpoint Security, RiskClassification-,SecurityStatusDetails-{"Current Auditing Policy":" Success_and_Failure", "Expected Auditing Policy":" \"Success and Failure\" or \"Failure\""},Timestamp-7/10/2015 11:38:25 AM,ZoneName-Default Zone RMHOST,7/10/2015 11:38:25 AM,CurrentDeviceRisk-0, DeviceIPAddress-192.168.88.141,DeviceName-CQT-ESV-51B.CSD.COM,FriendlyRiskItemName-Windows Auditing Disabled (Logon), InternalRiskItemName-WS-Auditing-Logon, ISOClassification-Vulnerability,RawRiskValue-0, RiskAreaName-Endpoint Security,RiskClassification-, SecurityStatusDetails-{"Current Auditing Policy":" Success_and_Failure","Expected Auditing Policy":" \"Success and Failure\" or \"Failure\""},Timestamp-7/10/2015 11:38:25 AM,ZoneName-Default Zone RMHOST,7/10/2015 11:38:25 AM,CurrentDeviceRisk-0, DeviceIPAddress-192.168.88.141,DeviceName-CQT-ESV-51B.CSD.COM,FriendlyRiskItemName-Windows Auditing Disabled (Other Events), InternalRiskItemName-WS-Auditing-Other-Events, ISOClassification-Vulnerability,RawRiskValue-0, RiskAreaName-Endpoint Security,RiskClassification-, SecurityStatusDetails-{"Current Auditing Policy":" Success_and_Failure","Expected Auditing Policy":" \"Success and Failure\" or \"Failure\""},Timestamp-7/10/2015 11:38:25 AM,ZoneName-Default Zone RMHOST,7/10/2015 11:38:25 AM,CurrentDeviceRisk-0, DeviceIPAddress-192.168.88.141,DeviceName-CQT-ESV-51B.CSD.COM,FriendlyRiskItemName-Windows Auditing Disabled (Logoff), InternalRiskItemName-WS-Auditing-Logoff, ISOClassification-Vulnerability,RawRiskValue-0, RiskAreaName-Endpoint Security,RiskClassification-, SecurityStatusDetails-{"Current Auditing Policy":" Success_and_Failure","Expected Auditing Policy":" \"Success and Failure\" or \"Failure\""},Timestamp-7/10/2015 11:38:25 AM,ZoneName-Default Zone

///////////////////KPV///////////////////////

{{Hostname: RMHOST, TimeStamp: 7/10/2015 11:41:23 AM}{
"DeviceName": "CQT-ESV-51B.CSD.COM",
"DeviceIPAddress": "192.168.88.141",
"ZoneName": "Default Zone",
"InternalRiskItemName": "MAL-No-Protection-Enabled",
"FriendlyRiskItemName": "Malware Protection Not Enabled",
"RiskAreaName": "Endpoint Security",
"RiskClassification": "",
"RawRiskValue": 0.0,
"CurrentDeviceRisk": 0.0,
"ISOClassification": "Vulnerability",
"Timestamp": "2015-07-10T11:41:23.8968739-07:00",
"SecurityStatusDetails": "{\"AV Status\":\" N/A\", \"AWL Status\":\" N/A\"}"
}}
{{Hostname: RMHOST, TimeStamp: 7/10/2015 11:41:23 AM}{
"DeviceName": "CQT-ESV-51B.CSD.COM",
"DeviceIPAddress": "192.168.88.141",
"ZoneName": "Default Zone",
"InternalRiskItemName": "BU-Not-Installed",
"FriendlyRiskItemName": "Backup software not installed",
"RiskAreaName": "Backup",
"RiskClassification": "Error",
"RawRiskValue": 0.6,
"CurrentDeviceRisk": 0.0,
"ISOClassification": "Vulnerability",
"Timestamp": "2015-07-10T11:41:23.9437503-07:00",
"SecurityStatusDetails": "{\"Backup Software\":\" Not Installed\"}"
}}
{{Hostname: RMHOST, TimeStamp: 7/10/2015 11:41:23 AM}{
"DeviceName": "CQT-ESV-51B.CSD.COM",
"DeviceIPAddress": "192.168.88.141",
"ZoneName": "Default Zone",
"InternalRiskItemName": "AT-High-CPU-Usage",
"FriendlyRiskItemName": "CPU usage exceeded threshold",
"RiskAreaName": "Endpoint Security",
"RiskClassification": "",
"RawRiskValue": 0.0,
"CurrentDeviceRisk": 0.0,
"ISOClassification": "Threat",
"Timestamp": "2015-07-10T11:41:23.9750011-07:00", "SecurityStatusDetails": "{\"CPU Usage\": \"42.97007%\"}"
}}
{{Hostname: RMHOST, TimeStamp: 7/10/2015 11:41:23 AM}{
"DeviceName": "CQT-ESV-51B.CSD.COM",
"DeviceIPAddress": "192.168.88.141",
"ZoneName": "Default Zone",
"InternalRiskItemName": "MAL-No-Protection-Installed",
"FriendlyRiskItemName": "Malware Protection Not Installed",
"RiskAreaName": "Endpoint Security",
"RiskClassification": "":
"RawRiskValue": 0.0,
"CurrentDeviceRisk": 0.0,
"ISOClassification": "Vulnerability",
"Timestamp": "2015-07-10T11:41:23.9906246-07:00",
"SecurityStatusDetails": "{\"AV Installed\":\"McAfee\",\"AWL Installed\":\" None\"}"
}}
{{Hostname: RMHOST, TimeStamp: 7/10/2015 11:41:24 AM}{
"DeviceName": "CQT-ESV-51B.CSD.COM",
"DeviceIPAddress": "192.168.88.141",
"ZoneName": "Default Zone",
"InternalRiskItemName": "AWL-Present",
"FriendlyRiskItemName": "AWL Not Installed",
"RiskAreaName": "Endpoint Security",
"RiskClassification": "Error",
"RawRiskValue": 0.3,
"CurrentDeviceRisk": 0.0,
"ISOClassification": "Vulnerability",
"Timestamp": "2015-07-10T11:41:24.0218781-07:00",
"SecurityStatusDetails": "{\"AWL Installed\":" None\"}"
}}
{{Hostname: RMHOST, TimeStamp: 7/10/2015 11:41:24 AM}{
"DeviceName": "CQT-ESV-51B.CSD.COM",
"DeviceIPAddress": "192.168.88.141",
"ZoneName": "Default Zone",
"InternalRiskItemName": "AV-Present",
"FriendlyRiskItemName": "AV Not Installed",
"RiskAreaName": "Endpoint Security",
"RiskClassification": "",
"RawRiskValue": 0.0,
"CurrentDeviceRisk": 0.0,
"ISOClassification": "Vulnerability",
"Timestamp": "2015-07-10T11:41:24.0375032-07:00",
"SecurityStatusDetails": "{\"Antivirus Installed\":" McAfee\",\"Antivirus Version\":\"5600.1067\"}"
}}
{{Hostname: RMHOST, TimeStamp: 7/10/2015 11:41:24 AM}{
"DeviceName": "CQT-ESV-51B.CSD.COM",
"DeviceIPAddress": "192.168.88.141",
"ZoneName": "Default Zone",
"InternalRiskItemName": "AT-High-Memory-Usage",
"FriendlyRiskItemName": "Memory usage exceeded threshold",
"RiskAreaName": "Endpoint Security",
"RiskClassification": "",
"RawRiskValue": 0.0,
"CurrentDeviceRisk": 0.0,
"ISOClassification": "Threat",
"Timestamp": "2015-07-10T11:41:24.0531288-07:00",
"SecurityStatusDetails": "{\"Memory Usage\": \"86.79%\"}"
}}
{{Hostname: RMHOST, TimeStamp: 7/10/2015 11:41:24 AM}{
"DeviceName": "CQT-ESV-51B.CSD.COM",
"DeviceIPAddress": "192.168.88.141",
"ZoneName": "Default Zone",
"InternalRiskItemName": "AV-Definition-File-Date",
"FriendlyRiskItemName": "DAT Out of Date",
"RiskAreaName": "Endpoint Security",
"RiskClassification": "Error",
"RawRiskValue": 0.75,
"CurrentDeviceRisk": 0.0,
"ISOClassification": "Vulnerability",
"Timestamp": "2015-07-10T11:41:24.068754-07:00",
"SecurityStatusDetails": "{\"DAT Age\":" about 10 months, 19 days ago\",\"DAT Date\":" 2014-08-25\"}"
}}
{{Hostname: RMHOST, TimeStamp: 7/10/2015 11:41:24 AM}{
"DeviceName": "CQT-ESV-51B.CSD.COM",
"DeviceIPAddress": "192.168.88.141",
"ZoneName": "Default Zone",
"InternalRiskItemName": "MAL-No-Protection-Installed",
"FriendlyRiskItemName": "Malware Protection Not Installed",
"RiskAreaName": "Endpoint Security",
"RiskClassification": "",
"RawRiskValue": 0.0,
"CurrentDeviceRisk": 0.0,
"ISOClassification": "Vulnerability",
"Timestamp": "2015-07-10T11:41:24.1000053-07:00",
"SecurityStatusDetails": "{\"AV Installed\":" McAfee\",\"AWL Installed\":" None\"}"
}}
{{Hostname: RMHOST, TimeStamp: 7/10/2015 11:41:25 AM}{
"DeviceName": "CQT-ESV-51B.CSD.COM",
"DeviceIPAddress": "192.168.88.141",
"ZoneName": "Default Zone",
"InternalRiskItemName": "WS-Auditing-Logon",
"FriendlyRiskItemName": "Windows Auditing Disabled (Logon)",
"RiskAreaName": "Endpoint Security",
"RiskClassification": "",
"RawRiskValue": 0.0,
"CurrentDeviceRisk": 0.0,
"ISOClassification": "Vulnerability",
"Timestamp": "2015-07-10T11:41:25.6781729-07:00",
"SecurityStatusDetails": "{"Current Auditing Policy\": \"Success_and_Failure\",\"Expected Auditing Policy\": \"\\\"Success and Failure\\\"\" or \\\"Failure\\\"\"}"
}}
{{Hostname: RMHOST, TimeStamp: 7/10/2015 11:41:25 AM}{
"DeviceName": "CQT-ESV-51B.CSD.COM", "DeviceIPAddress": "192.168.88.141",
"ZoneName": "Default Zone",
"InternalRiskItemName": "WS-Auditing-Account-Lockout",
"FriendlyRiskItemName": "Windows Auditing Disabled (Account Lockout)",
"RiskAreaName": "Endpoint Security",
"RiskClassification": "",
"RawRiskValue": 0.0,
"CurrentDeviceRisk": 0.0,
"ISOClassification": "Vulnerability",
"Timestamp": "2015-07-10T11:41:25.6937959-07:00",
"SecurityStatusDetails": "{\"Current Auditing Policy\":\"Success_and_Failure\",\"Expected Auditing Policy\":\"\"\\\"Success and Failure\\\"\" or \\\"Failure\\\"
\"}"
}}
{{Hostname: RMHOST, TimeStamp: 7/10/2015 11:41:25 AM}{
"DeviceName": "CQT-ESV-51B.CSD.COM",
"DeviceIPAddress": "192.168.88.141",
"ZoneName": "Default Zone",
"InternalRiskItemName": "WS-Auditing-Special-Logon",
"FriendlyRiskItemName": "Windows Auditing Disabled (Special Logon)",
"RiskAreaName": "Endpoint Security",
"RiskClassification": "",
"RawRiskValue": 0.0,
"CurrentDeviceRisk": 0.0,
"ISOClassification": "Vulnerability",
"Timestamp": "2015-07-10T11:41:25.7250488-07:00",
"SecurityStatusDetails": "{"Current Auditing Policy":" Success_and_Failure\",\"Expected Auditing Policy\":\"\"\\\"Success and Failure\\\"\" or \\\"Failure\\\"
\"}"
}}
{{Hostname: RMHOST, TimeStamp: 7/10/2015 11:41:25 AM}{
"DeviceName": "CQT-ESV-51B.CSD.COM",
"DeviceIPAddress": "192.168.88.141",
"ZoneName": "Default Zone",
"InternalRiskItemName": "WS-Auditing-Logoff",
"FriendlyRiskItemName": "Windows Auditing Disabled (Logoff)",
"RiskAreaName": "Endpoint Security",
"RiskClassification": "",
"RawRiskValue": 0.0,
"CurrentDeviceRisk": 0.0,
"ISOClassification": "Vulnerability",
"Timestamp": "2015-07-10T11:41:25.7406782-07:00",
"SecurityStatusDetails": "{\"Current Auditing Policy\":\"Success_and_Failure\",\"Expected Auditing Policy\":\"\"\\\"Success and Failure\\\"\" or \\\"Failure\\\"
\"}"
}}
{{Hostname: RMHOST, TimeStamp: 7/10/2015 11:41:25 AM}{
"DeviceName": "CQT-ESV-51B.CSD.COM",
"DeviceIPAddress": "192.168.88.141",
"ZoneName": "Default Zone",
"InternalRiskItemName": "WS-Auditing-Other-Events",
"FriendlyRiskItemName": "Windows Auditing Disabled (Other Events)",
"RiskAreaName": "Endpoint Security",
"RiskClassification": "",
"RawRiskValue": 0.0,
"CurrentDeviceRisk": 0.0,
"ISOClassification": "Vulnerability",
"Timestamp": "2015-07-10T11:41:25.7562979-07:00",
"SecurityStatusDetails": "{\"Current Auditing Policy\":\"Success_and_Failure\",\"Expected Auditing Policy\":\"\"\\\ "Success and Failure\\\"\" or \\\"Failure\\\"
\"}"
}}

Note that the risk manager 154 and/or the other processes, devices, and techniques described herein could use or operate in conjunction with any combination or all of various features described in the following previously-filed patent applications (all of which are hereby incorporated by reference):

- U.S. patent application Ser. No. 14/482,888 entitled "DYNAMIC QUANTIFICATION OF CYBER-SECURITY RISKS IN A CONTROL SYSTEM";
- U.S. Provisional Patent Application No. 62/036,920 entitled "ANALYZING CYBER-SECURITY RISKS IN AN INDUSTRIAL CONTROL ENVIRONMENT";
- U.S. Provisional Patent Application No. 62/113,075 entitled "RULES ENGINE FOR CONVERTING SYSTEM-RELATED CHARACTERISTICS AND EVENTS INTO CYBER-SECURITY RISK ASSESSMENT VALUES" and corresponding non-provisional U.S. patent application Ser. No. 14/871,695;
- U.S. Provisional Patent Application No. 62/113,221 entitled "NOTIFICATION SUBSYSTEM FOR GENERATING CONSOLIDATED, FILTERED, AND RELEVANT SECURITY RISK-BASED NOTIFICATIONS" and corresponding non-provisional U.S. patent application Ser. No. 14/871,521;
- U.S. Provisional Patent Application No. 62/113,100 entitled "TECHNIQUE FOR USING INFRASTRUCTURE MONITORING SOFTWARE TO COLLECT CYBER-SECURITY RISK DATA" and corresponding non-provisional U.S. patent application Ser. No. 14/871,855;
- U.S. Provisional Patent Application No. 62/113,186 entitled "INFRASTRUCTURE MONITORING TOOL FOR COLLECTING INDUSTRIAL PROCESS CONTROL AND AUTOMATION SYSTEM RISK DATA" and corresponding non-provisional U.S. patent application Ser. No. 14/871,732;
- U.S. Provisional Patent Application No. 62/113,165 entitled "PATCH MONITORING AND ANALYSIS" and corresponding non-provisional U.S. patent application Ser. No. 14/871,921;
- U.S. Provisional Patent Application No. 62/113,152 entitled "APPARATUS AND METHOD FOR AUTOMATIC HANDLING OF CYBER-SECURITY RISK EVENTS" and corresponding non-provisional U.S. patent application Ser. No. 14/871,503;
- U.S. Provisional Patent Application No. 62/114,928 entitled "APPARATUS AND METHOD FOR DYNAMIC CUSTOMIZATION OF CYBER-SECU- RITY RISK ITEM RULES" and corresponding non-provisional U.S. patent application Ser. No. 14/871,605;

U.S. Provisional Patent Application No. 62/114,865 entitled "APPARATUS AND METHOD FOR PROVIDING POSSIBLE CAUSES, RECOMMENDED ACTIONS, AND POTENTIAL IMPACTS RELATED TO IDENTIFIED CYBER-SECURITY RISK ITEMS" and corresponding non-provisional U.S. patent application Ser. No. 14/871,814; and U.S. Provisional Patent Application No. 62/114,937 entitled "APPARATUS AND METHOD FOR TYING CYBER-SECURITY RISK ANALYSIS TO COMMON RISK METHODOLOGIES AND RISK LEVELS" and corresponding non-provisional U.S. patent application Ser. No. 14/871,136; and U.S. Provisional Patent Application No. 62/116,245 entitled "RISK MANAGEMENT IN AN AIR-GAPPED ENVIRONMENT" and corresponding non-provisional U.S. patent application Ser. No. 14/871,547.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for exporting cyber-security risk information in an industrial control system, comprising:
   monitoring, by a risk manager system, a plurality of connected devices in the industrial control system that are vulnerable to cyber-security risks;
   detecting, by the risk manager system, a cyber-security risk to one or more devices of the plurality of connected devices being monitored;
   identifying, by the risk manager system, an external system to be notified of the cyber-security risk;
   determining whether to send one or more filtered data streams or one or more unfiltered data streams to the external system based on a user selection option, the user selection option based on whether the external system is (i) a first system configured to process the one or more unfiltered data streams and not qualified for data collection in the industrial control system, or (ii) a second system configured to display the one or more filtered data streams to a user;
   receiving at least one filtering option for the one or more filtered data streams or the one or more unfiltered data streams; and
   sending cyber-security risk data, by the risk manager system, to the external system according to the cyber-security risk and the at least one filtering option.

2. The method of claim 1, wherein the at least one filtering option specifies an output format of the cyber-security risk data.

3. The method of claim 2, wherein the output format is one of an email message, a syslog service output, and a text messaging notification.

4. The method of claim 2, wherein the output format is one of a comma-separated values format and a key-value pairs format.

5. The method of claim 1, wherein the at least one filtering option specifies at least one of a source of the cyber-security risk, a severity of the cyber-security risk, the one or more devices affected by the cyber-security risk, or an affected zone of the one or more devices affected by the cyber-security risk.

6. The method of claim 1, wherein the at least one filtering option specifies only sending data when the detected cyber-security risk crosses above a defined threshold.

7. The method of claim 1, wherein identifying the external system to be notified of the cyber-security risk comprises identifying at least one of an IP address and a port of the external system.

8. A risk manager system for exporting cyber-security risk information in an industrial control system, comprising:
   at least one processing device;
   at least one network interface; and
   at least one memory containing instructions,
   wherein the at least one processing device is configured, when executing the instructions, to:
      monitor a plurality of connected devices, in the industrial control system, that are vulnerable to cyber-security risks;
      detect a cyber-security risk to one or more devices of the plurality of connected devices being monitored;
      identify an external system to be notified of the cyber-security risk;

determine whether to send one or more filtered data streams or one or more unfiltered data streams to the external system based on a user selection option, the user selection option based on whether the external system is (i) a first system configured to process the one or more unfiltered data streams and not qualified for data collection in the industrial control system, or (ii) a second system configured to display the one or more filtered data streams to a user;

receive at least one filtering option for the one or more filtered data streams or the one or more unfiltered data streams; and send cyber-security risk data to the external system according to the cyber-security risk and the at least one filtering option.

9. The risk manager system of claim 8, wherein the at least one filtering option specifies an output format of the cyber-security risk data.

10. The risk manager system of claim 9, wherein the output format is one of an email message, a syslog service output, or a text messaging notification.

11. The risk manager system of claim 9, wherein the output format is one of a comma-separated values format and a key-value pairs format.

12. The risk manager system of claim 8, wherein the at least one filtering option specifies at least one of a source of the cyber-security risk, a severity of the cyber-security risk, the one or more devices affected by the cyber-security risk, or an affected zone of the one or more devices affected by the cyber-security risk.

13. The risk manager system of claim 8, wherein the at least one filtering option specifies only sending data when the detected cyber-security risk crosses above a defined threshold.

14. The risk manager system of claim 8, wherein the at least one processing device is configured to identify the external system to be notified of the cyber-security risk by identifying at least one of an IP address and a port of the external system.

15. A non-transitory machine-readable medium encoded with executable instructions for exporting cyber-security risk information in an industrial control system that, when executed, cause one or more processors of a risk manager system to:

monitor a plurality of connected devices, in the industrial control system, that are vulnerable to cyber-security risks;

detect a cyber-security risk to one or more devices of the plurality of connected devices being monitored;

identify an external system to be notified of the cyber-security risk;

determine whether to send one or more filtered data streams or one or more unfiltered data streams to the external system based on a user selection option, the user selection option based on whether the external system is (i) a first system configured to process the one or more unfiltered data streams and not qualified for data collection in the industrial control system, or (ii) a second system configured to display the one or more filtered data streams to a user;

receive at least one filtering option for the one or more filtered data streams or the one or more unfiltered data streams; and send cyber-security risk data to the external system according to the cyber-security risk and the at least one filtering option.

16. The non-transitory machine-readable medium of claim 15, wherein the at least one filtering option specifies an output format of the cyber-security risk data.

17. The non-transitory machine-readable medium of claim 16, wherein the output format is at least one of an email message, a syslog service output, a text messaging notification, a comma-separated values format, or a key-value pairs format.

18. The non-transitory machine-readable medium of claim 15, wherein the at least one filtering option specifies at least one of a source of the cyber-security risk, a severity of the cyber-security risk, the one or more devices affected by the cyber-security risk, or an affected zone of the one or more devices affected by the cyber-security risk.

19. The non-transitory machine-readable medium of claim 15, wherein the at least one filtering option specifies only sending data when the detected cyber-security risk crosses above a defined threshold.

20. The non-transitory machine-readable medium of claim 15, wherein the executable instructions when executed cause the one or more processors to identify the external system to be notified of the cyber-security risk by identifying at least one of an IP address and a port of the external system.

* * * * *